United States Patent Office 3,258,924
Patented July 5, 1966

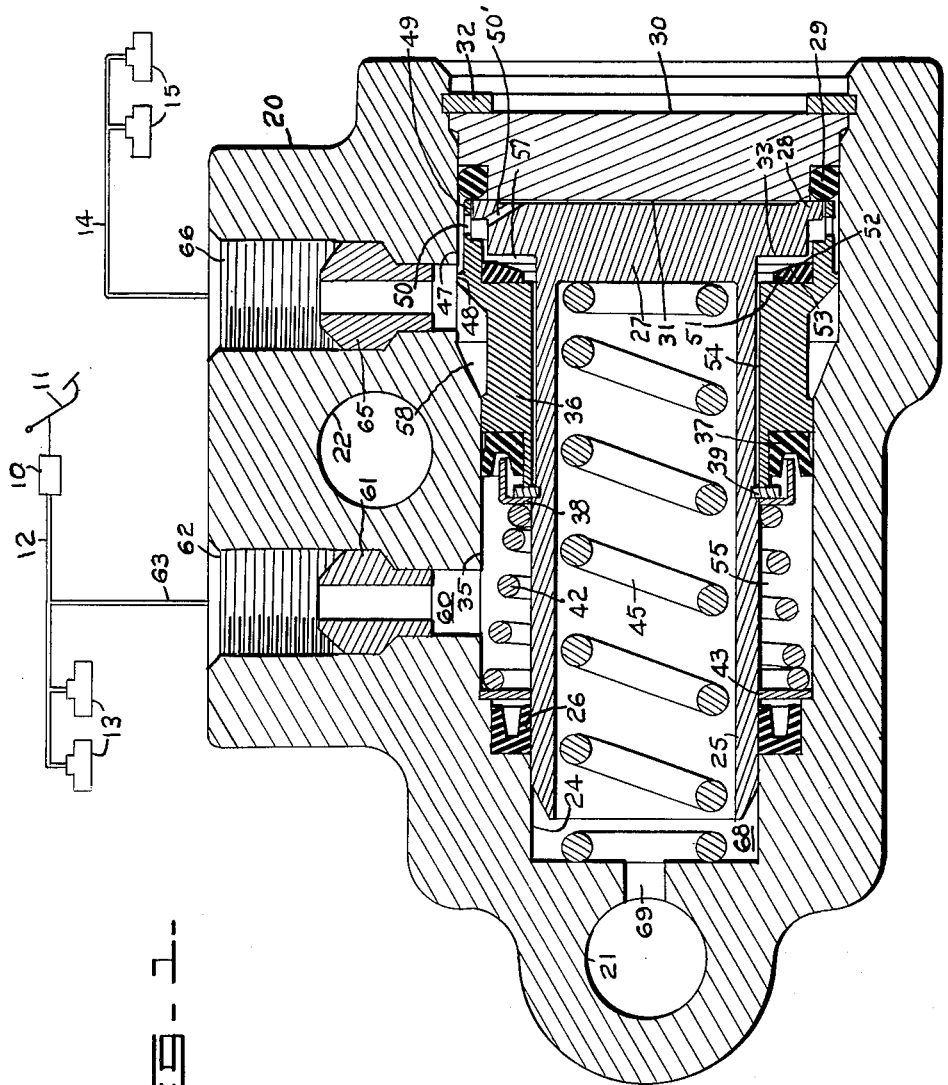

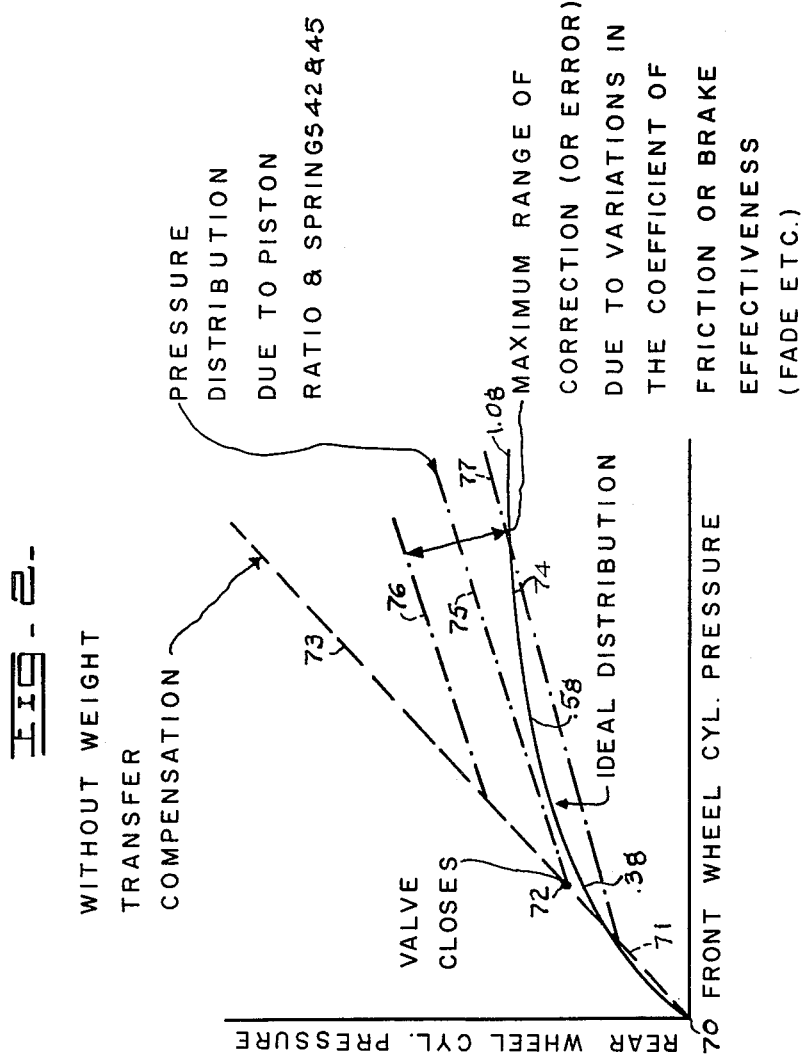

3,258,924
VEHICLE BRAKE MECHANISM
William Stelzer, Bloomfield Hills, Mich., assignor to Kelsey-Hayes Company, Romulus, Mich., a corporation of Delaware
Filed Aug. 16, 1963, Ser. No. 302,534
6 Claims. (Cl. 60—54.5)

This invention relates to a vehicle brake mechanism and particularly to a brake pressure reducing valve for compensating for vehicle weight transfer occurring during a brake application wherein the weight on the rear axle is reduced as the car decelerates. The present invention is an improvement over the structure shown in my co-pending application Serial No. 240,531, filed November 28, 1962, now Patent No. 3,217,494, granted November 16, 1965.

In my co-pending application referred to, I have disclosed a pressure responsive auxiliary valve mechanism connected between the master cylinder and the rear wheel cylinders of a motor vehicle and responsive to a predetermined master cylinder-generated pressure to thereafter prevent any substantial build-up in pressure in the rear wheel cylinders as compared with the front wheel cylinders. This pressure response occurs through operation of a piston movable by pressure to close a valve the seat of which is spring-biased to a normal position away from the valve.

Movement of the piston which carries the valve expands a space communicating with the rear wheel cylinders, and upon continued increase in master cylinder-generated pressures, the sleeve carrying the valve seat is movable to mechanically move the piston to displace fluid from the space referred to to the rear wheel cylinders to increase pressure therein, but at a rate much lower than the rate of increase in the primary pressure supplied to the front wheel cylinders.

An important object of the present invention is to provide a pressure reducing valve of the same general character, wherein a gradually changing ratio between the front and rear wheel cylinders is effected without being altered by sudden local pressure surges occurring through the rapid depression of the brake pedal.

A further object is to provide a novel arrangement of the valve elements to accomplish the results referred to, the device functioning accurately in accordance with master-cylinder generated pressures and functioning after the valve is closed to bleed further fluid into the rear wheel cylinders upon an increase in the primary pressure generated by the master cylinder.

Other objects and advantages of the invention will become apparent during the course of the following description.

In the drawings I have shown one embodiment of the invention. In this showing

FIGURE 1 is an axial sectional view through the compensating valve forming the principal subject matter of the present invention, the valve being substantially enlarged, the master cylinder and associated elements and the wheel cylinders being diagrammatically represented; and FIGURE 2 is a graph indicating hydraulic braking pressures under different braking conditions.

Referring to FIGURE 1, the numeral 10 designates a conventional master cylinder operative by a brake pedal 11 for displacing fluid through a line 12 and effecting the braking action. It will be apparent that the specific pressure generating means makes no difference in the operation of the present invention, and if desired, a booster or power operated master cylinder may be employed. The line 12 supplies hydraulic fluid under pressure to the front wheel cylinders 13. In a manner to be described, hydraulic fluid is supplied through a line 14 to the rear wheel cylinders 15.

The present invention comprises a valve body 20 having openings 21 and 22 to receive mounting bolts or posts to support the body 20. In one end, the body 20 is provided with a bore 24 in which is slidable the adjacent end of a hollow piston 25 sealed as at 26. The other end of the piston 25 is provided with a solid head 27 having an outstanding flange portion 28 engageable with a resilient cushion element 29, shown in the present instance as an O-ring. This ring is carried by a plug 30 slightly spaced as at 31 from the head 27, the plug being maintained in position by a snap ring 32. The head 27 is provided with a combined valve-engaging and pressure surface 33, further described below.

To the right of the seal 26 the bore 24 is enlarged as at 35 to receive one end of a sleeve piston 36. This piston is sealed as at 37 in the bore 35. Displacement of the seal is prevented by a retainer 38 fixed in position on the piston 25 by a snap ring 39.

A spring 42 engages at one end against the retainer 38 and its opposite end against a seat 43 engaging the shoulder at the left-hand end of the bore 35. A spring 45 is arranged in the piston 25 and biases such piston to its right-hand limit of movement in engagement with the O-ring 29, and the biasing action of the spring 45 is increased by the addition of the force of the spring 42 acting through the retainer 38 and snap ring 39.

A bore 47, co-axial with the bore 35, is formed in the right-hand end of the body 20 and the adjacent end of the piston 36 is enlarged as at 48 to slide in the bore 47. Beyond such enlargement 48, the piston 36 is provided with an axially extending annular flange 49 apertured as at 50. The head 27 is ported at 50' to open the space 31 to the aperture 50. The internal diameter of the right-hand end of the sleeve piston 36 is substantially larger than its internal diameter to receive a valve 51 bonded to the piston 36. This valve has an outer face portion 52 perpendicular to the axis of the device and engageable by the surface 33 to be closed under conditions to be described. The inner portion of the valve 51 is provided with a sloping face 53, the purpose of which will become apparent.

An annular space 54 is provided between the pistons 25 and 36 to form a passage for the flow of fluid from the chamber 55 in which the spring 42 is arranged, through the space 57, between the valve 51 and surface 33, and through the apertures 50 into an outlet chamber 58. The right-hand end of the piston flange 49 normally engages the O-ring 29 as shown in FIGURE 1.

The chamber 55 communicates through a passage 60 and through a union, the portion of which is shown as 61, with a port 62 connected by a fluid line 63 to the line 12. The chamber 58 communicates through a union, an element of which is indicated as 65, with a port 66 connected to the line 14 leading to the rear wheel cylinders.

It is preferred that the chamber 68, formed by the bore 24 and the interior of the piston 25 be vented to the atmosphere. To this end, the body 20 is provided with a port 69 leading into the opening 21. The mounting element arranged in such opening will have clearance with respect thereto so that the port 69 will be opened to the atmosphere.

As described in detail below, displacement of fluid from the master cylinder equally applies increasing pressures to the front and rear brakes up to a predetermined point, at which time the valve 51 will be engaged by the surface 33. Beyond such point, front wheel braking pressures will be generated equal to pressures in the master cylinder, while increases in pressures in the rear wheel cylinders will occur at a substantially lower rate.

In FIGURE 2 the axis of abscissa indicates front wheel cylinder pressure, while the axis of ordinates indicates rear wheel cylinder pressures. With the brakes released, pressures will be at zero (70 in FIGURE 2), and upon the generation of braking pressures, pressure increases occur equally in the front and rear wheels at a 1:1 ratio as indicated by the line 71 in FIGURE 2, up to the point 72 when the valve 51 closes. Beyond such point the ratio between the front and rear wheel cylinder pressures changes progressively as indicated by the line 75. Obviously, the rate of increase in pressure in the front wheel cylinders is substantially greater than the rate of increase in pressures in the rear wheel cylinders. In an ideal brake operation, the front and rear wheel cylinder pressures would occur approximately as indicated in the line 74, and the present mechanism satisfactorily approximates such ideal distribution.

With the present mechanism, the pressure increases indicated by the lines 75 may vary within the limits indicated by the lines 76 and 77, these two lines indicating the maximum range of correction or error due to variations in the co-efficient of friction or in brake effectiveness, in accordance with brake fade, etc. With normally functioning and properly adjusted brakes, the front and rear wheel pressure increases will be as indicated by the line 75. In any case, the rate of rear brake pressure increases will be substantially less than in the front wheel cylinders. The lines 73 in FIGURE 2 indicate the continuance of the 1:1 hydraulic pressure ratio when no compensating valve device is used.

In FIGURE 2, the values $g$ indicate the retarding forces in relation to vehicle weight as $F/W$, where F is the retarding force at the road surface and W is the weight of the vehicle. As an example, .5 g. would occur at approximately 16 ft. sec.$^2$ deceleration.

*Operation*

The parts of the compensating valve mechanism normally occupy the positions shown in FIGURE 1, that is, when the brake pedal is released. The brakes are applied by depressing the pedal 11 to operate the master cylinder or the power or booster mechanism associated therewith. Fluid will flow through line 12 to the front wheel cylinders. From the line 12, fluid will flow through line 63, port 62, passage 60, chamber 55, annular passage 54, space 57, ports 56, chamber 58 and port 66 through line 14 to the rear wheel cylinders. Thus, initially all of the wheel cylinders are connected to the pressure source and brake cylinder pressures, both front and rear, will increase at a 1:1 ratio. Approximately at the point 72 (FIGURE 2) the generated pressure, communicated to the space 31 through port 50′, will act on the right-hand face of the head 27 to move the surface 33 into engagement with the valve 51, thus closing communication between the pressure source and the rear wheel cylinders. No more hydraulic fluid will be supplied to the rear wheel cylinders, except as indicated below. The pressure at which the valve 51 is closed, may be, in one example, 250 p.s.i. The valve 51 and surface 33 will now be in lap position. Further depression of the brake pedal and a consequent increase in pressure in the chamber 55 acts on the area of the portion of the surface 33 within its line of contact with the valve 51, the inner limit of this area being the external diameter of the piston 25. This increase in pressure, assisted by the springs 42 and 45, cracks the surface 33 with respect to the valve 51 to allow a further flow of fluid into the chamber 58 until a pressure balance is established again between the passage 54 and chamber 58. This rate of flow of fluid, when the valve is reopened, depends upon the increased source pressure and the increase in pressure in the rear wheel cylinders thus will be proportional to the front wheel pressures. The rate of increase in rear wheel cylinder pressures, however, will be much lower than the rate of increase in pressure at the front wheels.

The pressure ratio between the front and rear wheel cylinders follows a predetermined and fixed curve, depending upon the ratio of pressure surface controlling the valve 51 and the force of the springs 42 and 45. As an example, if the springs initially yield at 250 p.s.i. and the annular area mentioned above is equal to the cross-sectional area of the bore 24, then $$P_R = \frac{P_F + 250}{2}$$

wherein the $P_R$ is the hydraulic pressure in p.s.i. transmitted to the rear wheel cylinders and $P_F$ is the hydraulic pressure generated by the master cylinder and transmitted to the front wheel cylinders.

Throughout the brake application, the valve 51 and the adjacent portion of the head 27 remain substantially in lap positions, fluid bleeding past the valve with practically no movement of the plunger 25. The piston sleeve 36 remains in abutment against the O-ring 29. During the releasing of the brakes, wherein the hydraulic pressure in the master cylinder is being reduced, the pistons 25 and 36 move in unison to the left, due to rear wheel cylinder pressures. The valve 51 will be closed. Such movement reduces the hydraulic pressure in the rear wheel cylinders. When the hydraulic pressure is reduced sufficiently, as in the example of 250 p.s.i., the spring 45 moves the piston 25 to the right to open the valve 51, after which the pistons 25 and 36 return together to the position shown in FIGURE 1.

Should the hydraulic pressure in the chamber 55 be reduced below the pressure existing in the rear wheel cylinders, the pressures can be equalized by fluid bypassing the outer lip of the seal 37 through the clearance between the piston 36 and the bore 35. The pressure thus has descended approximately on the same curve as it first ascended in accordance with the diagram in FIGURE 2.

The valve device described, while quite simple, functions importantly in securing close to the ideal distribution of braking force, the device effectively compensating for vehicle weight transfer with respect to the rear wheels, occurring during a brake application. The device provides a greatly changed ratio between the front and rear wheel cylinders, not altered by sudden pressure surges from rapid depression of the brake pedal.

It is to be understood that the form of the invention shown and described is to be taken as a preferred example of the same, and that various changes in the shape, size and arrangement of the parts may be made as do not depart from the spirit of the invention or the scope of the appended claims.

I claim:

1. A brake mechanism for a motor vehicle having front and rear wheel cylinders, comprising means for generating hydraulic pressure, a fluid line for supplying hydraulic fluid from said means to the front wheel cylinders, and a compensating valve device having a body provided with an inlet communicating with said pressure generating means and an outlet communicating with the rear wheel cylinders, said device having passage means normally connecting said inlet to said outlet, an annular valve in said body, a pressure responsive member in said body having an annular valve seat surface normally disengaged from said valve to provide a space forming a part of said passage means, a spring biasing said pressure responsive member in the direction away from said inlet to a normal position, said pressure responsive member having a surface exposed to hydraulic pressure in said passage means to move against the loading of said spring to engage said valve and close said passage means when such pressure increases to a predetermined point, said pressure responsive member having a portion exposed to pressure in said source, whereby, upon a further increase in pressure above said predetermined point, such pressure acting against said portion of said pressure responsive member will move said member to move said valve seat from said valve for the restricted flow of hydraulic fluid to said outlet line to increase pressure in the rear wheel cylinders at a rate lower than pressure in said front wheel cylinders.

2. A mechanism according to claim 1 wherein said pressure responsive member is a piston having an annular flange at the end remote from said inlet, said valve being engageable annularly by the radially outer portion of said valve seat surface, said surface inwardly of said valve being the portion exposed to pressure in said source.

3. A mechanism according to claim 2 provided with a sleeve surrounding said piston and carrying said valve, said sleeve being slidable with said piston in the other direction when brake pressures are released to lower pressures in said rear wheel cylinders, said spring biasing said piston in one direction away from said inlet, whereby, when pressure in said rear wheel cylinders is lowered to a predetermined point, said spring will move said piston in said one direction relative to said valve to reopen said passage means.

4. A brake mechanism for a motor vehicle having front and rear wheel cylinders, comprising means for generating hydraulic pressure, a fluid line for supplying hydraulic fluid from said means to the front wheel cylinders, and a compensating valve device having a body provided with an inlet communicating with said pressure generating means and an outlet communicating with the rear wheel cylinders, said device having passage means normally connecting said inlet to said outlet, a valve in said body, a pressure responsive member having a valve seat surface normally disengaged from said valve to provide a space forming a part of said passage means, a spring biasing said pressure responsive member in one direction away from said inlet, said pressure responsive member having a surface facing in said direction and subject to pressure in said outlet to be moved in the other direction against said spring to engage said valve seat with said valve when such pressure increases to a predetermined point, a sleeve surrounding said member and carrying said valve and having a normal position in which said valve is disengaged from said seat, said pressure responsive member being movable in said other direction independently of said sleeve to close said valve, a portion of said valve seat surface being exposed to pressure in said source when said valve is closed, whereby, upon a further increase in pressure in said inlet after said valve is closed, said valve seat surface will move from said valve for a restricted flow of hydraulic fluid to said outlet line to increase pressure in the rear wheel cylinders at a rate lower than the rate of increase of pressure in said front wheel cylinders.

5. A mechanism according to claim 4 wherein said pressure responsive member is a piston having an annular flange remote from said inlet and provided with a surface forming said valve seat surface facing toward said inlet, said valve being annular and engageable with the radially outer portion of said valve seat surface, a portion of said surface radially inwardly of said valve constituting the surface portion exposed to pressure in said source.

6. A mechanism according to claim 4 wherein said pressure responsive member is a piston having an annular flange remote from said inlet and provided with a surface forming said valve seat surface facing toward said inlet, said valve being annular and engageable with the radially outer portion of said valve seat surface, a portion of said surface radially inwardly of said valve constituting the surface portion exposed to pressure in said source, said device having a bore in which said sleeve is slidable and one end of said bore forming a chamber communicating with said inlet, and a second spring in said chamber biasing said sleeve to its normal position.

References Cited by the Examiner

UNITED STATES PATENTS 2,835,271  5/1958  Oberthur _____ 60—54.5 X

FOREIGN PATENTS 444,955  3/1936  Great Britain.

SAMUEL LEVINE, *Primary Examiner.*

ROBERT R. BUNEVICH, *Examiner.*